United States Patent
Rasal et al.

(10) Patent No.: US 11,947,804 B2
(45) Date of Patent: Apr. 2, 2024

(54) HARDWARE LATENCY MONITORING FOR MEMORY DEVICE INPUT/OUTPUT REQUESTS

(71) Applicant: NVIDIA Corporation, Santa Clara, CA (US)

(72) Inventors: Shridhar Rasal, Pune (IN); Oren Duer, Kohav Yair (IL); Aviv Kfir, Nili (IL); Liron Mula, Hertzlia (IL)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/714,575

(22) Filed: Apr. 6, 2022

(65) Prior Publication Data
US 2023/0325089 A1    Oct. 12, 2023

(51) Int. Cl.
*G06F 12/00* (2006.01)
*G06F 3/06* (2006.01)
*G06F 13/00* (2006.01)

(52) U.S. Cl.
CPC .......... *G06F 3/0613* (2013.01); *G06F 3/0611* (2013.01); *G06F 3/0631* (2013.01); *G06F 3/0659* (2013.01); *G06F 3/067* (2013.01)

(58) Field of Classification Search
CPC .... G06F 3/0613; G06F 3/0611; G06F 3/0631; G06F 3/0659; G06F 3/067
USPC ........................................................ 711/154
See application file for complete search history.

(56) References Cited

U.S. PATENT DOCUMENTS

| | | | | |
|---|---|---|---|---|
| 6,301,603 B1* | 10/2001 | Maher | .................. | G06F 9/5044 712/34 |
| 6,324,492 B1* | 11/2001 | Rowe | ..................... | H04L 43/50 718/100 |
| 8,838,931 B1* | 9/2014 | Marshak | ............... | G06F 3/0605 711/170 |
| 8,935,493 B1* | 1/2015 | Dolan | .................. | G06F 3/0649 711/161 |
| 9,043,512 B1* | 5/2015 | Merchant | ............. | G06F 3/0683 710/39 |
| 9,311,207 B1* | 4/2016 | Marshak | ............. | G06F 11/3419 |
| 9,465,548 B1* | 10/2016 | Hrischuk | ............ | G06F 11/3447 |
| 9,946,465 B1* | 4/2018 | Martin | ................. | G06F 3/0688 |
| 10,235,055 B1* | 3/2019 | Saad | ..................... | G06F 3/0653 |
| 10,268,526 B1* | 4/2019 | Martin | ................ | G06F 11/3452 |
| 10,474,383 B1* | 11/2019 | Wang | ..................... | G06F 3/0634 |
| 11,321,252 B2* | 5/2022 | Nielsen | ................ | G06F 3/0656 |
| 11,399,344 B2* | 7/2022 | Kumar | .................. | G06F 1/3221 |
| 11,513,684 B1* | 11/2022 | Tylik | .................... | G06F 3/0644 |

(Continued)

*Primary Examiner* — Sheng Jen Tsai
(74) *Attorney, Agent, or Firm* — Lowenstein Sandler LLP

(57) ABSTRACT

A system includes a hardware circuitry having a device coupled with one or more external memory devices. The device is to detect an input/output (I/O) request associated with an external memory device of the one or more external memory devices. The device is to record a first timestamp in response to detecting the IO request transmitted to the external memory device. The device is further to detect an indication from the external memory device of a completion of the IO request associated with the external memory device and record a second timestamp in response to detecting the indication. The device is also to determine a latency associated with the IO request based on the first timestamp and the second timestamp.

20 Claims, 7 Drawing Sheets

(56) References Cited

U.S. PATENT DOCUMENTS

| | | | |
|---|---|---|---|
| 2009/0210560 A1* | 8/2009 | Yudenfriend | G06F 13/122 710/5 |
| 2013/0211809 A1* | 8/2013 | Maruyama | G06F 30/3312 703/21 |
| 2015/0373017 A1* | 12/2015 | Oelke | H04L 63/0807 710/17 |
| 2017/0024144 A1* | 1/2017 | Hrischuk | G06F 3/0629 |
| 2017/0026265 A1* | 1/2017 | Hrischuk | H04L 43/028 |
| 2017/0026312 A1* | 1/2017 | Hrischuk | H04L 67/1097 |
| 2017/0201580 A1* | 7/2017 | Dimnaku | H04L 43/0852 |
| 2017/0269854 A1* | 9/2017 | Dimnaku | G06F 3/065 |
| 2020/0058330 A1* | 2/2020 | Chhabra | G06F 1/3275 |
| 2020/0110692 A1* | 4/2020 | Senin | G06F 11/3419 |
| 2022/0261158 A1* | 8/2022 | Dhanadevan | G06F 3/0679 |
| 2022/0321488 A1* | 10/2022 | Colonna | H04L 47/24 |
| 2022/0357891 A1* | 11/2022 | Wang | G06F 3/0629 |

\* cited by examiner

HARDWARE LATENCY MONITORING FOR MEMORY DEVICE INPUT/OUTPUT REQUESTS

TECHNICAL FIELD

At least one embodiment pertains to processing resources used to perform and facilitate network communications. For example, at least one embodiment pertains to technology for monitoring a latency for requests executed by external devices in hardware.

BACKGROUND

Network communication systems can include multiple devices coupled to a server and/or data processing units (DPUs) via a network—e.g., USB, Ethernet, wireless, peripheral component interconnect express (PCIe), etc. Devices of the network communication system can request information or data from the server or DPU. The DPU can include a system-on-chip (SOC) that manages the requests and an interface that enables the SOC to access the information from one or more memory devices (e.g., storage devices) of the DPU—e.g., memory devices external to the SOC. The SOC can monitor latencies associated with requests for one or more memory devices to determine a performance of the memory devices, or to determine errors in the system, or to control data congestion in the network communication system. Conventional methods monitor the latency in software or firmware. Such conventional methods can record when an I/O request is transmitted to a memory device and when the I/O request is completed by the device to determine and monitor latencies. However, determining the latency in software or firmware can take a relatively long time and the latency measured can be inaccurate. Additionally, the firmware and software can be limited by a script and fail to provide an overall average latency associated with each device over a plurality of IO requests. Accordingly, inaccurate and slow latency calculations can make it difficult to determine a performance of the memory devices, or to determine errors in the system, or to control data congestion in the network communication system.

BRIEF DESCRIPTION OF DRAWINGS

Various embodiments in accordance with the present disclosure will be described with reference to the drawings, in which.

DETAILED DESCRIPTION

Figure 1:
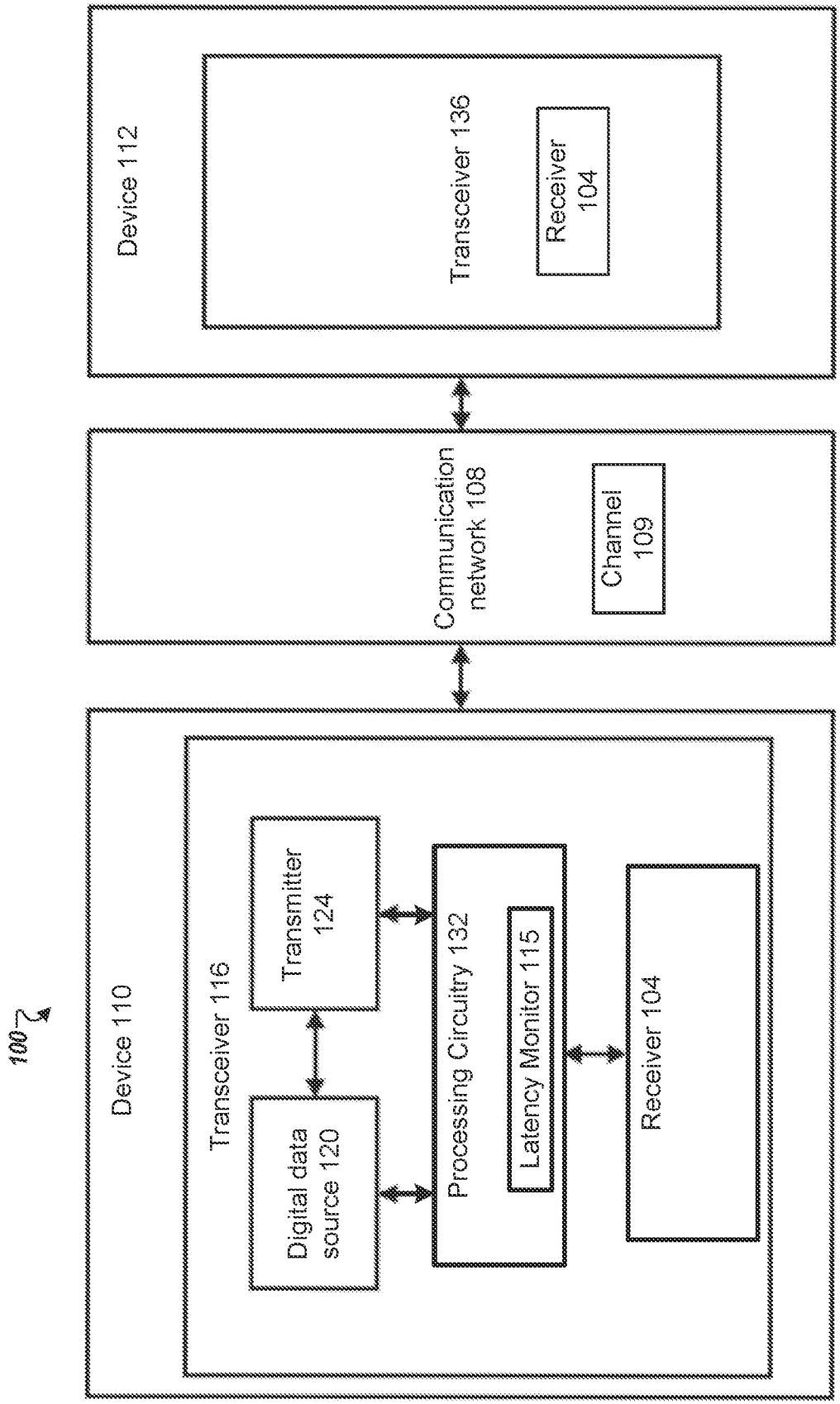
FIG. 1 is an example communication system implementing hardware latency monitoring, in accordance with at least some embodiments.

Network communication systems can include several devices (e.g., laptops, computers, desktops, tablets, smartphones, etc.) connected to a server (e.g., disk array) and data processing units (DPUs). The devices can be connected to the server via a wireless connection, Ethernet, USB, peripheral component interconnect express (PCIe), etc. Each device can request information from the server or the DPU. For example, the device can request data from the server and the server can communicate with the DPU to get the information. Similarly, each device can store information to the server. Accordingly, the DPU can include a system-on-chip (SOC) to handle input/output (e.g., read or write) requests. Specifically, the SOC can include a controller that receives requests over the network and communicates the request with firmware of the SOC. The firmware in turn can communicate the request with an interface (e.g., PCIE) coupled with one or more memory devices (e.g., drives or storage devices). For example, the firmware can communicate an IO request to the interface and the interface can communicate with a respective memory device to read or write the data indicated in the IO request. Each request can take some amount of time to be completed—e.g., each request can be associated with a latency. The SOC can determine a latency associated with a request by recording a time stamp when a request is transmitted (e.g., sent) to a respective memory device. The SOC can then record a second time stamp when the request is competed by the respective memory device and determine the latency by taking a difference between the second timestamp and the first timestamp. In conventional solutions, the SOC can utilize the firmware to determine the latency associated with a respective IO request.

The SOC can utilize the latency to determine performances of the memory devices e.g., determine how quickly memory devices are executing requests. Additionally, the SOC can utilize the latencies to determine errors (e.g., disk removal) and initiate recovery when such errors are discovered. The SOC can also use the latencies to control congestion—e.g., balance IO requests between faster and slower memory devices coupled to the SOC. However, performing the latency calculations in the firmware can be inaccurate and time consuming. For example, the SOC may utilize multiple components or blocks in the software and firmware to perform the latency calculations—e.g., adding additional processing time to the latency determination. The SOC performance can also be negatively impacted due to utilizing additional logical components to record timestamps and determine the latency. Also, the SOC may use a script or program to determine the latencies. Accordingly, the latency calculations can be limited by the logic reflected in the script. For example, the script can determine an average latency for multiple reads or writes but fail to consider an average across a large number of IO requests. Accordingly, conventional methods can cause difficulties to accurately determine latencies and determine performance, errors, and control congestion.

Advantageously, aspects of the present disclosure can address the deficiencies above and other challenges by providing hardware for performing latency monitoring of memory devices coupled with the SOC. For example, the SOC can include a latency monitoring component coupled with the interface or the external memory devices and dedicated to determining an average latency across a large number of IO requests. In one example, the latency monitoring component can detect or receive an indication from the interface when a IO request is sent to a respective memory device and record a first timestamp—e.g., the latency monitor can detect the request and an identifier within the request that specifies a memory device of a number of memory devices connected to the SOC. The latency monitoring component can also detect or receive an indication from the interface when the IO request is completed and record a second timestamp. In some examples, the latency monitoring component can determine latency associated with the IO request by determining a difference between the second timestamp and the first timestamp. The latency monitoring component can perform similar calculations for a plurality of IO requests associated with the respective memory device to determine an average latency. In some examples, the latency monitoring component can also determine a maximum latency, a minimum latency, or a standard deviation value associated with the average latency. The latency monitor can also generate a histogram representative of the latencies observed based on user defined ranges.

In some examples, there can be more memory devices in the system than a number of memory devices the latency monitoring component can monitor at a respective time. Accordingly, the latency monitoring component can use a multiplexing scheme to select a group of memory devices to profile—e.g., the latency monitoring component can select a first memory device and a second memory device from a number of memory devices coupled with the SOC. The latency monitoring component can select the devices based on user input or based on performance, error, or congestion metrics. Additionally, the latency monitoring component can switch which devices are selected for profiling—e.g., go from the first memory device and second memory device at a first time to a third memory device and a fourth memory device at a second time. In at least one example, the latency monitoring component can also determine if the average latency is below a first threshold associated with performance or a second threshold associated with errors and generate an indication for a firmware of the SOC if one or both thresholds fail to be satisfied (e.g., exceeded).

It should be noted that utilizing the latency monitoring component for the external memory device is one example and the latency monitoring component can monitor latencies of other devices associated with or coupled to the SOC. For example, the latency monitoring component can monitor the latency of any device that processes a command in a timely manner—e.g., for any device that processes a command where a time to process the command is a factor for the performance of the system. For example, the latency monitoring component can monitor the latency of switches, data processing units (DPUs), network adapters, and other storage devices—e.g., devices coupled remotely via a network or physically coupled to the SOC.

By utilizing the latency monitoring component, the system can determine the average latency associated with a device in hardware. Accordingly, the latency monitoring component can decrease times associated with performing latency calculations, provide more accurate latency calculations, and be utilized to monitor latencies of any device within the system. As the latency monitoring component reduces times associated with performing latency calculations, the overall performance of the system can be improved. Additionally, the system can utilize the latency monitoring component for error recovery or congestion control. That is, the system can use the latency monitoring to correct or fix errors and balance requests between different devices coupled—e.g., between slower and faster devices to ensure there is no congestion in the system. Further, the latency monitoring component is configurable and can be used to track different device characteristics or switch between which devices are tracked in response to user input e.g., the latency monitor is not limited by a script program.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

In one specific but non-limiting example, the communication network 108 is a network that enables data transmission between the devices 110 and 112 using data signals (e.g., digital, optical, wireless signals). Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In some embodiments, the communication network 108 can include one or more paths associated with transmitting data and one or more paths associated with transmitting a clock signal.

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104 of device 112. Additional details of the structure of the transmitter 102 are discussed in more detail below with reference to the figures.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 6.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

In some examples, processing circuitry 132 can include latency monitor 115. In an embodiment, latency monitor 115 can be configured to determine an average latency associated with a third device (not illustrated) within the system 100. For example, the latency monitor 115 can be configured to determine an average latency associated with external memory devices, storage devices, switches, data processing units (DPUs), network adapter, etc. That is, the latency monitor 115 can determine the average performance of the third device while handling respective requests. In an embodiment, the latency monitor 115 can determine the latency by detecting a request associated with the third device and record a first timestamp in response to detecting or receiving an indication that the request being transmitted to the device. In such embodiments, the latency monitor 115 can detect or receive a second indication from the third device of a completion of the request and record a second timestamp in response to detecting the second indication. In some embodiments, the latency monitor 115 can determine the latency associated with the IO request by taking a difference between the second timestamp and the first timestamp. In at least one embodiment, the latency monitor 115 can perform the latency calculation for a plurality of IO requests associated with the third device to determine an average latency associated with the second device. In some embodiments, the latency monitor 115 can also calculate a maximum latency, a minimum latency, a standard deviation value associated with the average latency, or generate a histogram representative of the latencies observed. Although shown in the processing circuitry 132, the latency monitor 115 can be located anywhere within the device 110 and device 112. For example, the latency monitor 115 can be coupled with a data bus, an interface, or a network interface. Additional details regarding the latency monitor 115 are described with reference to FIGS. 2-6.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2:
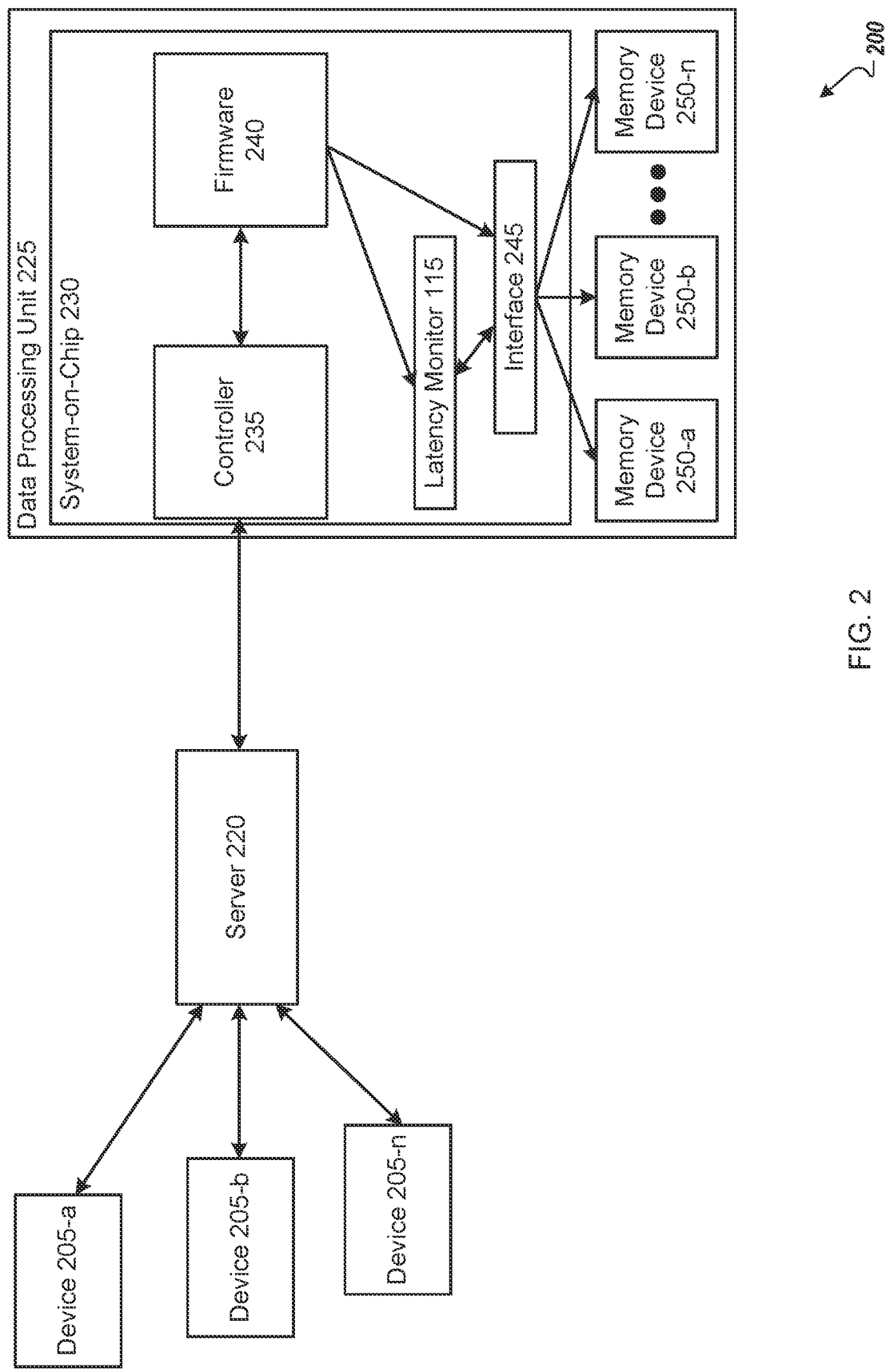
FIG. 2 illustrates an example communication system implementing hardware latency monitoring, in accordance with at least some embodiments.

FIG. 2 illustrates a system 200 implementing hardware latency monitoring according to at least one embodiment. In an embodiment, system 200 can be an example of a data center or network storage center. The system 200 can include device 205-a, device 205-b, device 205-n, server 220, and a data processing unit (DPU) 225. In an embodiment, device 205-a, device 205-b, and device 205-n can be examples of device 110 and device 112 as described with reference to FIG. 1. The DPU 225 can include a system-on-chip (SOC) 230 and memory device 250. The SOC 230 can further include a controller 235, firmware 240, an interface 245, and a latency monitor 115 as described with reference to FIG. 1.

In some embodiments, devices 205 can be examples of, including but not limited to: televisions, smart phones, cellular telephones, personal digital assistants (PDAs), portable media players, netbooks, laptop computers, electronic book readers, tablet computers, desktop computers, set-top boxes, gaming consoles, and the like. In at least one embodiment, devices 205 are configured to request information from or store information at the server 220 or DPU 225—e.g., the devices 205 are configured to transmit read commands or write commands to the server 220 or DPU 225. In some embodiments, devices 205 can be remote devices. In such embodiments, devices 205 can initiate remote direct memory access (RDMA) at the server 220 or the DPU 225—e.g., initiate remote reads or writes.

In some embodiments, server 220 is configured to facilitate communications between the devices 205 and the DPU 225. In at least one embodiment, the server 220 is configured to store data accessible by the DPU 225. In some embodiments, the server 220 may be a computer system that includes one or more physical devices (e.g., a processing device (e.g., a GPU), memory, one or more I/O devices, etc.) and a hypervisor and/or a host operating system that manage one or more requests between devices 205 and the DPU 225. In at least one embodiment, the server 220 can be an example of a tower server, a rack server, a blade server, or a disk array. Although one server 220 is shown, the system 200 may include one or more servers 220, each server 220 communicating with a different set of devices 205.

In at least one embodiment, data processing unit (DPU) 225 is configured to process data and handle requests received from devices 205—e.g., the DPU 225 is configured to move data around in a data center or system 200. In at least one embodiment, the DPU 225 includes a system-on-chip (SOC or SoC) 230. In some embodiments, the SOC 230 can include a multi-core central processing unit (CPU) in an arm architecture (not illustrated) to facilitate processing data. In such embodiments, the multi-core CPU arm architecture can couple the controller 235 with the firmware 240. In at least one embodiment, the SOC 230 can include a last level cache (LLC) shared by the controller 235, firmware 240, or interface 245. In some examples, the SOC can also include a controller 235. In at least one example, the controller 235 is an example of a network interface controller coupling the DPU 225 to the server 220 or a computer network (e.g., cloud network). In some embodiments, the controller 235 is configured to receive input/output (IO) requests from the server 220—e.g., receive the read and write commands from the server 220. In some embodiments, the controller 235 is configured to process the IO requests received and transmit them to the firmware 240. In some embodiments, the controller 235 is configured to transmit data associated with completed IO requests back to the server 220 or the devices 205—e.g., transmit data associated with a read command received. In at least one embodiment, firmware 240 is configured to receive requests from the controller 235 and transmit the requests to the interface 245 and memory devices 250. In some embodiments, the firmware 240 is configured to receive data or information associated with a completed request from the interface 245 and communicate the received data or information to the controller 235. In some embodiments, the firmware 240 can also process data or the requests.

In some embodiments, the DPU 225 can include an interface 245 that communicates requests between the firmware 240 and the memory device 250. In at least one embodiment, the interface 245 is an example of a data bus, a network interface, USB, or PCIe, etc. In some embodiments, the DPU 225 can include a latency monitor 115 that is coupled with or located near the interface 245. It should be noted the location of the latency monitor 115 in FIG. 2 is an example of one possible location of the latency monitor 115. In some embodiments, the latency monitor 115 can be coupled with a different device or component of the DPU 225. For example, the latency monitor 115 can be coupled with the controller 235, a network adapter, a switch, or coupled with the DPU 225 itself. That is, the latency monitor 115 can be coupled with any device that processes commands in a time sensitive manner—e.g., a time spent to complete the request or command is a factor to a performance of the respective device. In at least one embodiment, the latency monitor 115 can be configured to determine or calculate a latency (e.g., average latency) associated with respective devices coupled to the latency monitor 115. For example, the latency monitor 115 can be configured to determine an average latency associated with memory device 250-a, controller 235, or DPU 225. In some embodiments, the latency monitor 115 can determine the latency by recording a first timestamp when a command or request is sent to the device and a second timestamp when the command or request is completed by the device—e.g., the latency monitor 115 can record a first timestamp when a command or request is transmitted to the memory device 250-a from the interface and record a second timestamp when the command or request is completed by the memory device 250-a. In such embodiments, the latency monitor 115 can determine the latency by determining a difference between the first timestamp and the second timestamp.

Additional details regarding the latency monitor 115 are described with reference to FIGS. 3 and 4.

In at least one embodiment, memory devices 250 are configured to store data for devices 205 or server 220. In some embodiments, memory devices 250 are examples of non-volatile memory express (NVMe) drives. In at least one embodiment, the memory devices 250 can be referred as external memory devices—e.g., the memory devices 250 can be external to the SOC 230 within the DPU 225.

Figure 3:
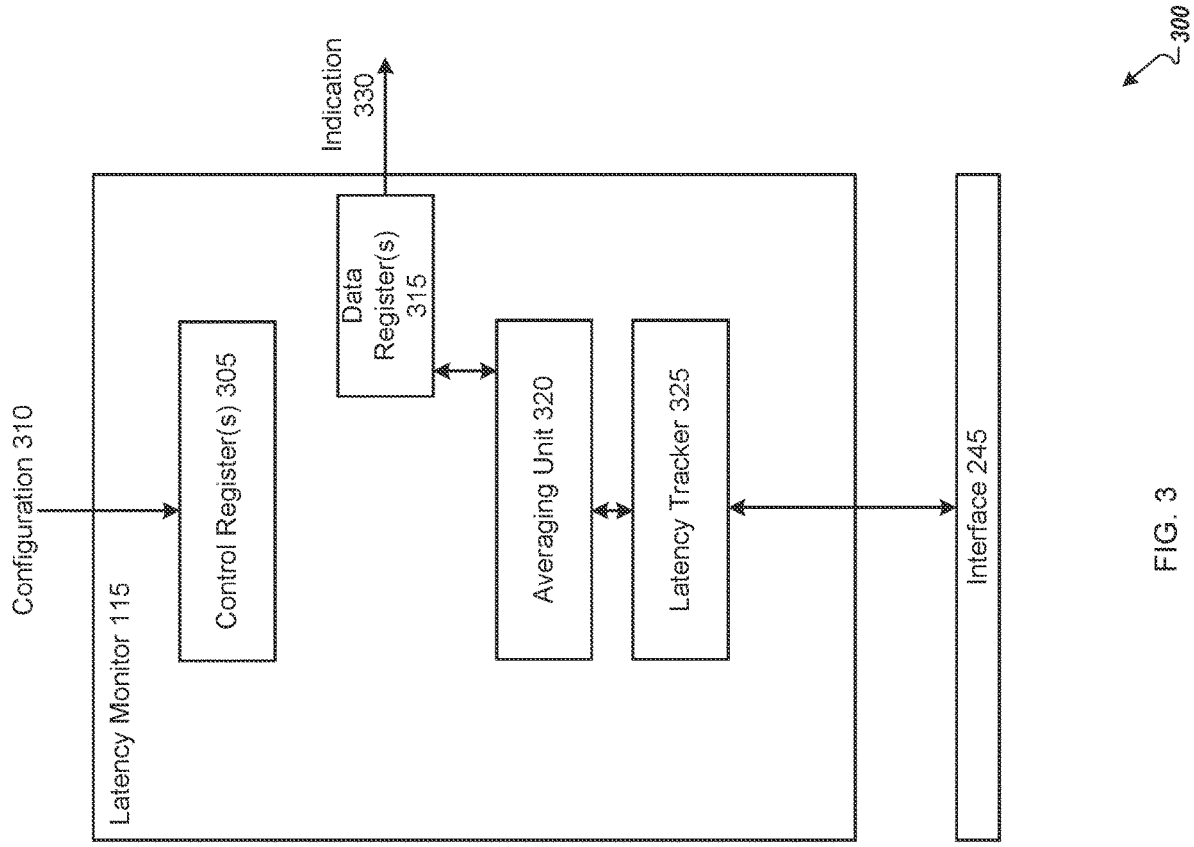
FIG. 3 is an example latency monitoring component, in accordance with at least some embodiments.

FIG. 3 illustrates an example communication system 300 according to at least one example embodiment. In at least one embodiment, communication system 300 includes a latency monitor 115 as described with reference to FIG. 1 and an interface 245 as described with reference to FIG. 2. In at least one embodiment, the example communication system 300 is located within the data processing unit (DPU) 225 as described with reference to FIG. 2. The latency monitor 115 includes control register(s) 305, data register(s) 315, an averaging unit 320, and a latency tracker 325.

In an embodiment, control register(s) 305 are configured to store programming instructions or configuration 310 provided via user input. That is, the control register 305 is configured to be programmed by configuration 310 provided by a user. In some embodiments, the control register 305 is configured to store which devices to monitor. For example, the system 300 can include an N number of memory devices 250 (e.g., as described with reference to FIG. 2) and the control register 305 can store configuration 310 indicating which memory devices of the N number of memory devices 250 to monitor—e.g., the control register 305 could store configuration 310 indicating to monitor a first memory device 250 and a second memory device 250 of the N number of memory devices 250. In some embodiments, the control register 305 is configured to store configuration 310 that indicates a number of devices to monitor collectively—e.g., a number of devices to determine an average latency for. For example, the latency monitor 115 can be configured to determine a latency for a single device or a set of devices, the set including two (2) or more devices—e.g., the latency monitor 115 can determine a combined or collective latency for both a first memory device and a second memory device. Additional details regarding which devices the latency monitor 115 monitors is described with reference to FIG. 4.

In some embodiments, the control register 305 can store configuration 310 that indicates a type of request (e.g., input/output (IO) request) to monitor at the latency monitor 115. That is, the latency monitor 115 can be configured to track a latency associated with respective command types. In some embodiments, the latency monitor 115 can track the latency associated with one of a read request, write request, flush request, deallocation request, reservation request, or any other command within a command set associated with the memory devices 250. Accordingly, the control register 305 can store the configuration 310 that specifies the type of command to track the latency for. In some embodiments, the latency monitor 115 is configured to track a latency for multiple types of requests concurrently—e.g., determine a latency for write requests and determine a latency for read requests completed by a respective memory device 250.

In at least one embodiment, the control register 305 is configured to indicate a type of calculation to perform or a value to determine at the latency monitor 115. In some embodiments, the latency monitor 115 can be configured to determine a latency, an average latency, a maximum latency, a minimum latency, or a standard deviation value associated with the average latency. In such embodiments, the control register 305 can indicate which value or calculation to perform. Additionally, the latency monitor 115 can configured to generate a histogram, where the configuration 310 indicates a number of ranges to include in the histogram and a value for a span of the range—e.g., the control register 305 is configured to store information regarding the generation of the histogram based on user input. For example, the latency monitor 115 can generate a histogram with five (5) ranges, each range spanning an equal number of seconds, millisecond, or picoseconds based on the configuration 310 provided to the control register 305.

In some embodiments, the control register 305 is configured to store configuration 310 indicating a threshold latency. In some embodiments, the control register 305 is configured to store more than one threshold latency—e.g., the control register 305 can store two or more threshold latencies. In at least one embodiment, the latency monitor 115 is configured to generate an indication 330 to a firmware (e.g., firmware 240 as described with reference to FIG. 2) if a calculated latency fails to satisfy (e.g., exceeds) a threshold latency. In such embodiments, the threshold latency can be associated with a performance of the memory devices—e.g., exceeding the threshold latency can indicate the performance of the memory devices is poor. In some embodiments, the threshold latency can be associated with an error operation—e.g., exceeding the error threshold latency can indicate there are too many errors in the system. In some embodiments, the latency monitor 115 can store a first threshold latency associated with performance and a second threshold latency associated with errors. In some embodiments, the control register 305 can also store configuration 310 indicating an action to take if the threshold latency fails to be satisfied—e.g., the configuration 310 can indicate to generate an indication 330 and transmit the indication 330 to firmware when the threshold latency is not satisfied.

In an embodiment, data registers 315 are configured to store recorded timestamps, latency values, average latency values, maximum latency, minimum latency, standard deviation associated with the average latency, etc.—e.g., the data register 315 are configured to store information associated with the latency calculated by the latency monitor 115. In at least one embodiment, the data registers 315 are configured to determine if a stored latency value satisfies or fails to satisfy the threshold latencies stored at the control register 305. For example, the data registers 315 can be configured to compare a stored latency or average latency value with the threshold latency. If the data register 315 determines the stored or determined latency value satisfies the threshold latency, the data register 315 can refrain from taking additional actions. If the data register 315 determines the stored or determined latency value fails to satisfy (e.g., exceeds) the threshold latency, the data register 315 can generate an indication 330 and transmit the indication 330 to firmware. In such embodiments, the indication 330 can indicate whether the first latency threshold or the latency second threshold (or both) are not satisfied. In some embodiments, the firmware can take actions in response to receiving the indication 330. For example, the firmware can perform error operations or error recovery if the error latency threshold is not satisfied. In such examples, the firmware can perform error recovery in a controller (e.g., controller 235) data path or detect disk removal. In other examples, the firmware can reset components within the system 200 or take other actions to improve the performance of the memory devices. For example, the firmware can reconfigure the memory devices 250 or the requests such that slower memory devices 250 receive less requests than faster memory devices 250—e.g., the firmware can alleviate congestion in the system.

In at least one embodiment, averaging unit 320 is configured to calculate a latency or an average latency. In some embodiments, the averaging unit 320 is configured to determine a moving latency average—e.g., determine a latency average over a previous predetermined number of IO requests. For example, the averaging unit 320 can be configured to determine the average latency during a previous 100 IO requests. In some embodiments, the averaging unit 320 is configured to determine a different latency for different types of requests (e.g., a different latency for read requests and write requests) or a different latency for different devices selected for profiling by the latency monitor 115—e.g., determine a latency for a set of memory device or determine a different latency for a first memory device and a second memory device. In at least one embodiment, the averaging unit 320 is configured to calculate the latency by taking a difference between a second timestamp and a first timestamp received from the latency tracker 325. In such embodiments, the averaging unit 320 can continue to calculate a latency for each IO request received and calculate an average latency in response to determining the latency for each IO request. In some embodiments, the averaging unit 320 is configured to transmit the timestamps and the calculated latency to the data registers 315.

In some embodiments, latency tracker 325 is configured to track a latency for each selected request type associated with a selected device. For example, the latency tracker 325 can be configured to track a read latency for a first memory device and a write latency for a second memory device. In some embodiments, the latency tracker 325 can receive requests that are sent to and from the interface 245 and the memory devices. For example, the interface 245 can transmit a request to a memory device and transmit an indication to the latency tracker 325 that the request is transmitted. In such examples, the interface 245 can also receive an indication from the memory devices that the request is complete and transmit the indication to the latency monitor 115. In other embodiments, the latency monitor 115 can detect requests and indications sent between the memory devices and the interface—e.g., the latency monitor 115 can detect the requests and indications transmitted via a data bus. In some embodiments, the latency tracker 325 can determine an identifier for each request sent between the interface 245 and the memory device. In such embodiments, the latency tracker 325 can determine whether the request is for a selected memory device. Additionally, the latency tracker 325 can utilize the identifier to ensure the same request that was sent to the memory device is completed when the indication is sent to the interface 245. That is, the interface 245 can transmit and receive numerous requests and indications from the N number of memory devices coupled to the interface 245. In such examples, the interface 245 can utilize the identifier to ensure that a response from the memory device corresponds to the request sent to the memory device—e.g., the identifier can indicate that a request is a read request transmitted to a first memory device and indicate a response is associated with the first memory device completing the read request. In some embodiments, the latency tracker 325 can identify or determine timestamps associated with transmitting and receiving the IO requests between the interface 245 and the memory devices. For example, the latency tracker 325 can determine a first timestamp associated with transmitting a request to a first memory device and determine a second timestamp associated with receiving an indication that the first memory device completed the respective request. In such examples, the latency tracker 325 is configured to transmit the first timestamp and second timestamp to the averaging unit 320.

Figure 4:
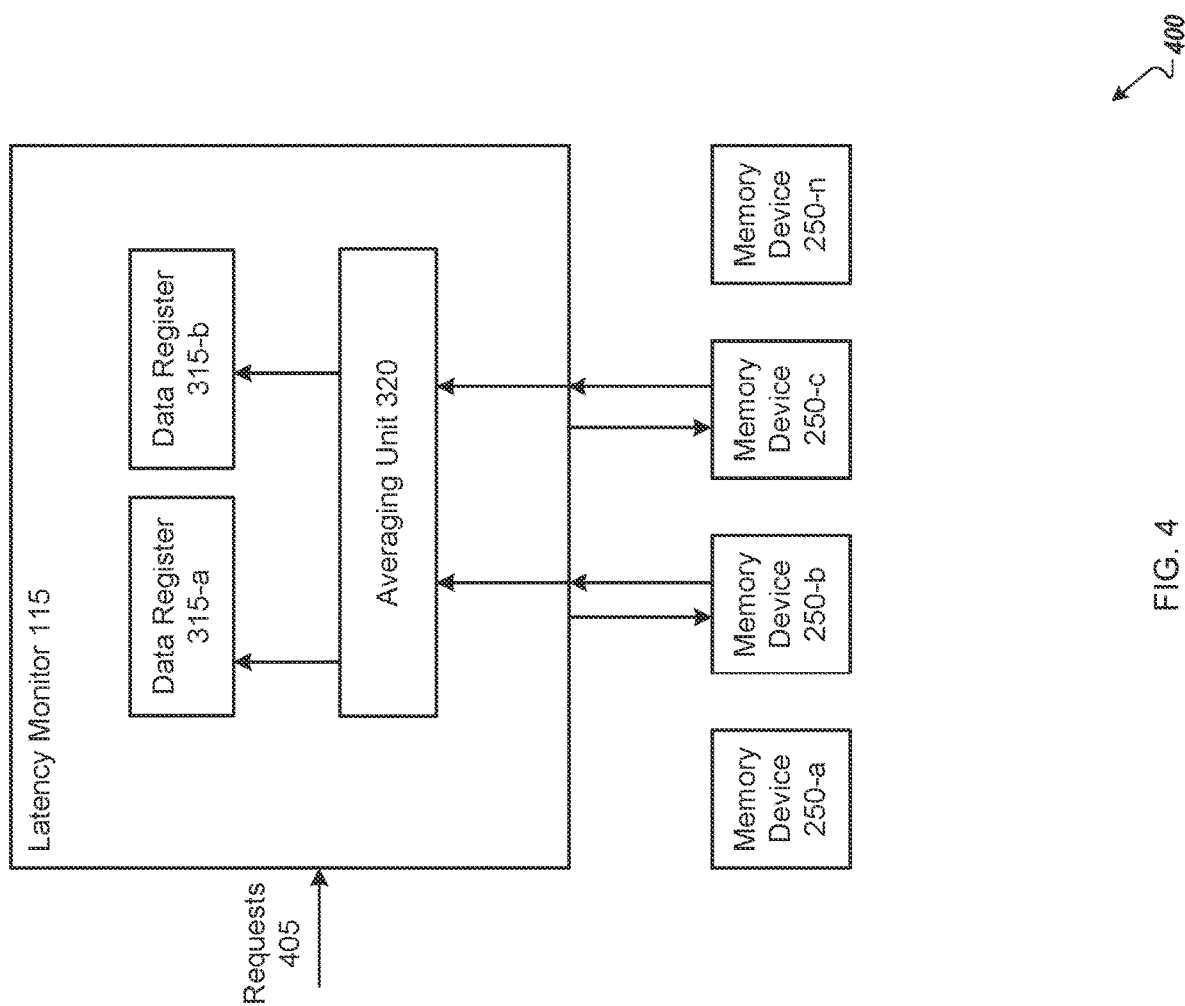
FIG. 4 is a diagram illustrating latency monitoring for memory device I/O requests, in accordance with at least some embodiments.

FIG. 4 illustrates an example communication system 400 according to at least one example embodiment. In at least one embodiment, communication system 400 is an example of communication system 300 as described with reference to FIG. 3. The system 400 includes a latency monitor 115 as described with reference to FIG. 1 and one or more memory devices 250 as described with reference to FIG. 2. In at least one embodiment, the example communication system 300 is located within the data processing unit (DPU) 225 as described with reference to FIG. 2. The latency monitor 115 includes data register(s) 315 and an averaging unit 320 as described with reference to FIG. 3. Although not illustrated for the sake of clarity, the latency monitor 115 can also include interface 245, control register(s) 305, and latency tracker 325 as described with reference to FIG. 3—e.g., the latency tracker 325 can be coupled between the averaging unit 320 and the memory device 250.

In at least one embodiment, the latency monitor 115 can include less data registers 315 than memory devices 250. For example, the latency monitor 115 can be coupled with an N number of memory devices 250 (e.g., with memory device 250-*n*). In such examples, the latency monitor 115 may include just a few data registers 315—e.g., two data registers 315 as illustrated in FIG. 4. Accordingly, the latency monitor 115 can utilize a multiplexing scheme to determine a latency of a selected number of memory device 250 at a respective time.

For example, in some embodiments, the control register can indicate to select memory device 250-*b* and memory device 250-*c* for profiling. In such embodiments, the latency monitor 115 can select or assign data register 315-*a* to the memory device 250-*b* and select or assign data register 315-*b* to memory device 250-*c*. Accordingly, the latency monitor 115 can receive or detect requests 405 between the interface and the memory device 250 and utilize the latency tracker 325 to determine which requests 405 are associated with the memory device 250-*b* and which requests 405 are associated with the memory device 250-*c*. In some embodiments, the latency monitor 115 can store the latency information associated with the memory devices 250 at the respective assigned or selected data registers 315—e.g., store latency information associated with memory device 250-*b* at data register 315-*a* and store latency information associated with memory device 250-*c* at data register 315-*b*. As described with reference to FIG. 3, the latency information can include average latency, maximum latency, minimum latencies, timestamps, standard deviation values associated with the average latency, or histogram data.

It should be noted that although FIG. 4 illustrates one data register 315 for one memory device 250 selected for profiling, other configurations are possible. For example, the latency monitor 115 can select a set of memory devices—e.g., memory device 250-*b* and memory device 250-*c*. In such embodiments, the latency monitor 115 can select one data register 315 for the set of memory devices—e.g., select data register 315-*a* when profiling the set of memory devices 250-*b* and 250-*c*. In other embodiments, the latency monitor 115 can select additional registers for a respective memory device 250 based on configuration 310 stored at the control register(s) 305—e.g., based on a type of command or a type of value or calculation to perform. For example, the latency monitor 115 can select data register 315-*a* to store all latencies associated with memory device 250-*b* to determine a sum of the latencies and select data register 315-*b* to store a number of samples or latencies observed at a respective time—e.g., the latency monitor 115 can assign two (2) data registers 315 for each memory device 250 or set of memory devices 250 profiled. In other embodiments, the latency monitor 115 can assign or select additional data registers 315 for a memory device 250 or a group of memory devices 250 when performing the standard deviation calculations or generating the histogram—e.g., select three (3), four (4), five (5), six (6), etc., registers for each memory device 250 or set of memory devices 250.

In some embodiments, the latency monitor 115 can change or reassign data registers 315 to different memory devices 250. For example, the control register 305 can receive a new configuration 310 in response to user input. In such examples, the new configuration 310 can indicate to profile memory device 250-*a* and memory device 250-*n*. Accordingly, the latency monitor 115 can assign or select the data register 315-*a* to the memory device 250-*a* and assign or select data register 315-*b* to the memory device 250-*n*. As such, the data register 315-*a* can be utilized for memory device 250-*b* at a first time and then for memory device 250-*a* at a second subsequent time. By implementing the multiplexing scheme, the latency monitor 115 can monitor or track latencies associated with the memory devices 250 without including a large quantity of data registers and without taking up a lot of area within the data processing unit (DPU)—e.g., DPU 225 as described with reference to FIG. 2.

Figure 5:
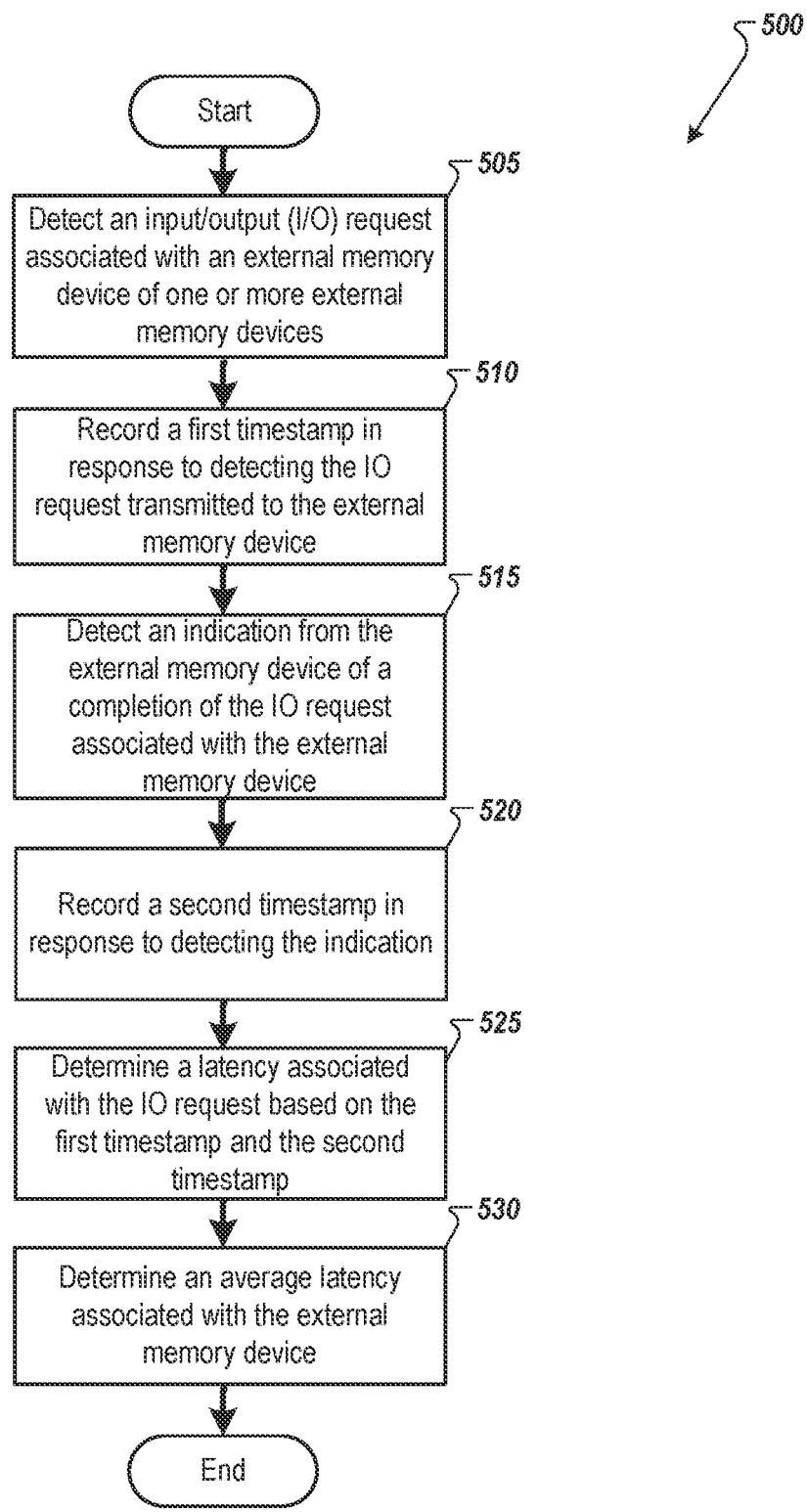
FIG. 5 is a flow diagram of a method for latency monitoring for memory device I/O requests, in accordance with at least some embodiments.

FIG. 5 illustrates an example flow diagram of a method 500 for hardware latency monitoring for memory device input/output (IO) requests, according to at least one embodiment. The method 500 can be performed by processing logic comprising hardware, software, firmware, or any combination thereof. In at least one embodiment, the method 500 is performed by the latency monitor 115, control registers 305, data registers 315, averaging unit 320, and latency tracker 325 as described with reference to FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for hardware latency monitoring for memory device IO requests are possible.

At operation 505, a device (e.g., latency monitor 115), coupled with one or more external memory device (e.g., memory device 250 as described with reference to FIG. 2), can detect an input/output (IO) request associated with an external memory device of the one or more external memory devices. In some embodiments, the device can also determine an identifier associated with the IO request—e.g., the latency tracker 325 is configured to determine an identifier for each request detected or received at the device. In such embodiments, the device can determine, based on the identifier, that the IO request is associated with the memory device of the one or more memory devices. For example, the latency tracker 325 can determine that an identifier of a first request associates the first request with a first memory device. In at least one embodiment, the device can also determine an identifier of a request or indication of a completed request at a memory device as described with reference to FIG. 3. That is, the device can determine the identifier to ensure the completed request detected or received was associated with the first request sent to the first memory device. In at least one embodiment, the device can also determine a type of IO request responsive to detecting the IO request associated with the external memory device. In such embodiments, the device can determine the latency associated with a first type of IO request and determine a second latency associated with a second type of IO request responsive to determining the type of IO request. That is, as described with reference to FIG. 3, the device can distinguish between different command types and keep a separate latency calculation for each different command type. In some embodiments, the first type of IO request and the second type of IO request is one of a write request, read request, flush request, deallocation request, or reservation request, where the first type IO request is different than the second type of IO request. In at least one embodiment, the type of IO request can be any request or command within a command set associated with the external memory device. In some embodiments, the device can be coupled to an interface, where the interface is one of a data bus or network interface—e.g., a PCIe interface.

At operation 510, the device can record a first time stamp in response to detecting the IO request associated with the external memory device. That is, the device can record the first timestamp indicating a time when the IO request was transmitted to the external memory device.

At operation 515, the device can detect an indication from the external memory device of a completion of the IO request associated with the external memory device.

At operation 520, the device can record a second timestamp in response to detecting the indication. That is, the device can record the second timestamp indicating a time when the IO request was completed by the external memory device. In at least one embodiment, the device can store the first timestamp and the second timestamp in a register of a plurality of registers, the register associated with the external memory device of the one or more external memory devices. In some embodiments, the device can select or assign the register of the plurality of registers to the memory device of the plurality of memory devices in response to a configuration stored in a control register of the device. As described with reference to FIG. 4, the device can include less registers than a number of external memory devices and utilize a multiplexing scheme to profile external memory devices. For example, each register of the plurality of registers is associated with a different external memory device of the one or more external memory devices at a first point in time. In such examples, a first external memory device of the one or more external memory devices is associated with a first register of the plurality of registers at the first point in time and a second external memory device of the one or more external memory devices is associated with the first register at a second point in time—e.g., the device can reassign a data register to a different memory device based on a new configuration received at the control registers.

At operation 525, the device can determine a latency associated with the IO request in response to recording the first timestamp and the second timestamp. In at least one embodiment, the device can determine the latency by determining a difference between the second timestamp and the first timestamp—e.g., Second timestamp−First timestamp=Latency.

At operation 530, the device can determine an average latency associated with the external memory device. For example, the device can detect a plurality of IO requests associated with the external memory device of the one or more external memory devices. In such examples, the device can determine a latency for each IO request of the plurality of IO requests associated with the external memory device and then determine the average latency for the external memory device in response to determining the latency for each IO request of the plurality of IO requests. As described with reference to FIGS. 3 and 4, the device can also determine the latency and average latency for a set of external memory devices. For example, the device can detect a plurality of IO requests associated with a set of external memory devices of the one or more external memory devices. In such examples, the device can determine a latency for each IO request of the plurality of IO requests associated with the set of external memory devices and determine an average latency associated with the set of external memory devices in response to determining the latency for each IO request of the plurality of IO requests.

In at least one embodiment, the device can determine a moving average (e.g., a weighted average) of the latency over a previously predetermined number of IO requests. In at least one embodiment, the device can also calculate at least one of a maximum latency, a minimum latency, or a standard deviation value associated with the average latency responsive to determining the latency for each IO request of the plurality of IO requests. In some embodiments, the device can generate a histogram indicating a number of latencies observed for each range of a plurality of ranges responsive to determining the latency for each IO request. In some embodiments, the device can determine a span of the range and the plurality of ranges by reading the control register—e.g., the control register can store a configuration 310 indicating a span of the range and which ranges to track the latencies for. In some examples, the device can determine the span of the range and the plurality of ranges in response to receiving user input.

In at least one embodiment, the device can also determine whether to raise an alert or indication to firmware of the system as described with reference to FIG. 3. For example, the device can compare the average latency associated with the external memory device with a threshold latency associated with the external memory device. In some embodiments, the threshold latency can be associated with a performance parameter or metric of the system. In some examples, the device can determine that the average latency fails to satisfy the threshold latency associated with the external memory device in response to the comparison—e.g., the average latency exceeds the threshold latency. Accordingly, the device can generate a second indication indicating the average latency associated with the external memory device fails to satisfy the threshold latency associated with the external memory device. In some embodiments, the device can transmit the second indication to firmware of the system. In some embodiments, the device can determine that the average latency satisfies the threshold latency and refrain from further action. In at least one embodiment, the device can select the threshold latency from a plurality of threshold latencies associated with the one or more external memory devices—e.g., select the threshold latency from a plurality of threshold latencies stored at the control register and provided by a user. In some embodiments, the device can also compare the average latency associated with the external memory device with a second threshold latency associated with the external memory device. In such embodiment, the device can determine the average latency fails to satisfy the second threshold latency associated with the external memory device in response to the comparison. Accordingly, the device can generate a third indication indicating the average latency associated with the external memory device fails to satisfy the threshold latency associated with the external memory device—e.g., the average latency exceeds the second threshold latency. In some embodiments, the second threshold latency is associated with an error rate or error threshold. In such embodiments, the device can transmit the third indication to firmware to initiate error recovery operations. In some embodiments, the device can determine the average latency satisfies the second threshold latency and refrain from further action.

Figure 6:
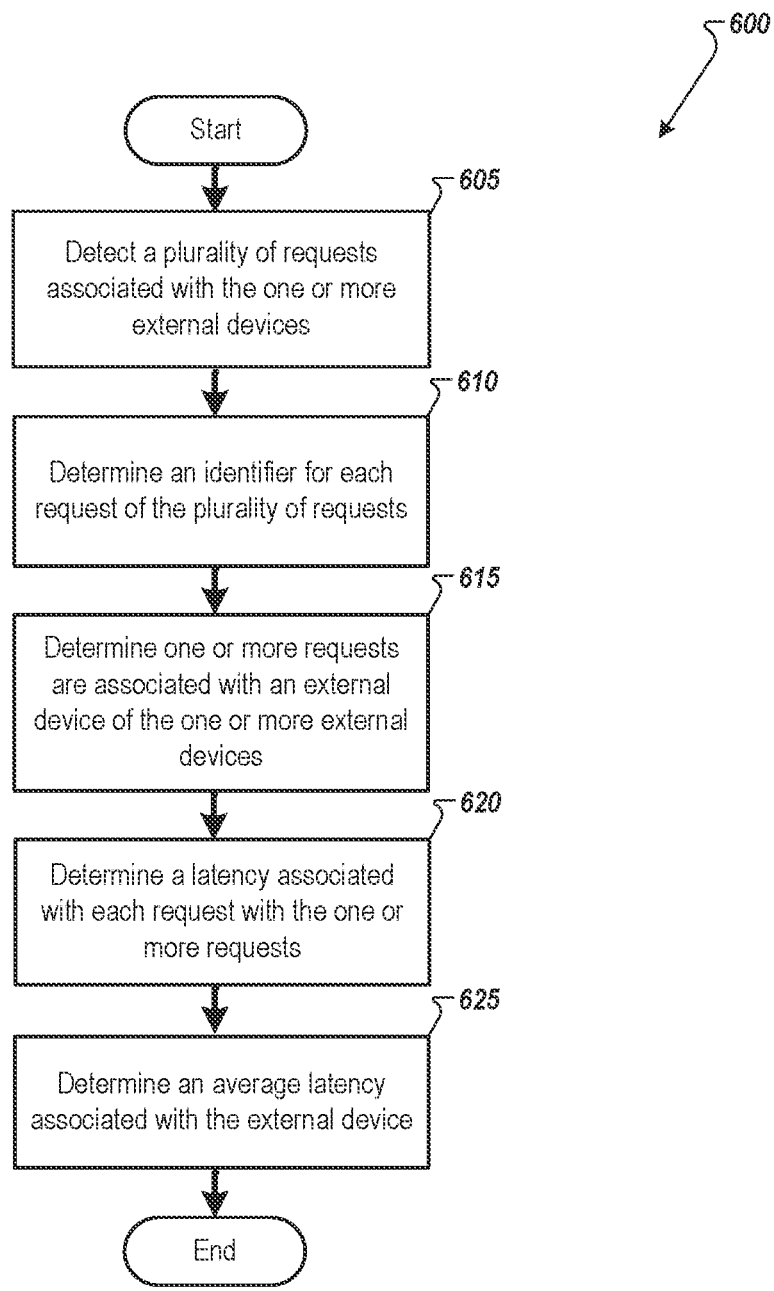
FIG. 6 is a flow diagram of a method for latency monitoring for device requests, in accordance with at least some embodiments.

FIG. 6 illustrates an example flow diagram of a method 600 for hardware latency monitoring for a device, according to at least one embodiment. The method 600 can be performed by processing logic comprising hardware, software, firmware, or any combination thereof. In at least one embodiment, the method 600 is performed by the latency monitor 115, control registers 305, data registers 315, averaging unit 320, and latency tracker 325 as described with reference to FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for hardware latency monitoring for a device are possible. As described with reference to FIG. 2, the latency monitor 115 can be utilized anywhere within the system 200. Accordingly, the latency monitor 115 can track latencies for any device in the system 200 processing commands in a time-sensitive manner—e.g., where a time taken to perform the command affects the performance of the system.

At operation 605, the device (e.g., latency monitor 115), coupled to one or more external devices, can detect a plurality of requests associated with the one or more external devices. In at least one embodiment, the external device is one of a network adapter, a switch, a data processing unit (DPU), or a storage device.

At operation 610, the device can determine an identifier for each request of the plurality of requests in response to receiving the plurality of requests.

At operation 615, the device can determine that one or more requests of the plurality of requests are associated with an external device of the one or more external devices. That is, the device can determine the one or more requests of the plurality of requests are associated with the external device in response to determining the identifier of each request.

At operation 620, the device can determine a latency associated with each request of the one or more requests. For example, as described with reference to operations 505-525 of FIG. 5, the device can record a first timestamp when a request is sent to the external device and a second timestamp when the request is completed by the external device, and take the difference between the second timestamp and the first timestamp to determine the latency.

At operation 625, the device can determine an average latency associated with the external device responsive to determining the latency associated with each request of the one or more requests. Additionally, the device can determine the latency for a set of external devices as described with reference to FIG. 3. In other embodiments, the device can determine a moving average, a maximum latency, a minimum latency, or a standard deviation value associated with the average latency responsive to determining the latency for each IO request of the plurality of IO requests. In some embodiments, the device can generate a histogram for the latency of the external device. In at least one embodiment, the device can determine a latency for different types of requests or commands associated with the external device—e.g., any command within a command set associated with the external device. In some embodiments, the device can utilize a multiplexing scheme described with reference to FIG. 4, to monitor the external devices. In other embodiments, the device can refrain from using a multiplexing scheme if a number of registers within the device are equal to or greater than a total number of external devices. In at least one embodiment, the device can compare the average latency with a first latency threshold or second latency threshold as described with reference to FIGS. 3 and 5.

Figure 7:
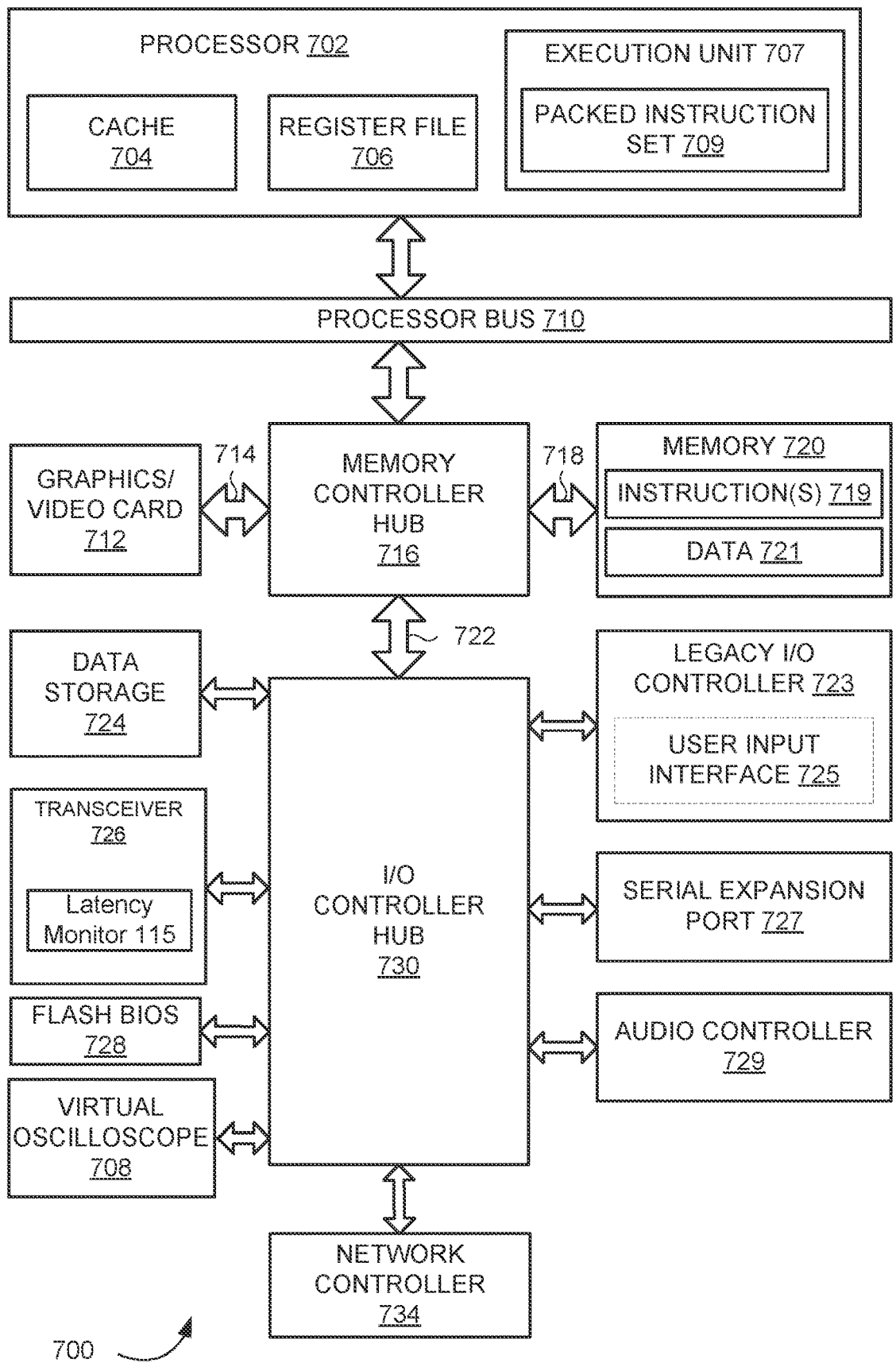
FIG. 7 illustrates an example computer system including a transceiver including a chip-to-chip interconnect for latency monitoring, in accordance with at least some embodiments.

FIG. 7 illustrates a computer system 700 in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702, to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, an execution unit of processor 702 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through high bandwidth memory path 718, and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips" in a transceiver 726—e.g., the transceiver 726 includes a chip-to-chip interconnect including the first device 110 and second device 112 as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof and utilize a GRS link. In at least one embodiment, one or more components of system 700 are interconnected using compute express link ("CXL") interconnects. In an embodiment, the transceiver 726 can include a latency monitor 115 as described with reference to FIG. 1. In such embodiments, the latency monitor 115 can determine an average latency associated with a third device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a processing circuitry having a device coupled with one or more external memory devices, the device to:
identify a configuration stored within a control register of the device, wherein the configuration indicates an external memory device of the one or more external memory devices;
detect, by a hardware latency tracker of the device coupled with an interface to the external memory device of the one or more external memory devices, an input/output (IO) request associated with the external memory device;
responsive to detecting the IO request associated with the external memory device, store a first timestamp in a data register;
detect, by the hardware latency tracker, an indication from the external memory device of a completion of the IO request associated with the external memory device;
responsive to detecting the indication, store a second timestamp in the data register; and
determine, by an averaging unit of the device, a latency associated with the IO request using the first timestamp and the second timestamp.

2. The system of claim 1, wherein the device is further to:
detect a plurality of IO requests associated with the external memory device of the one or more external memory devices;
determine a latency for each IO request of the plurality of IO requests; and
determine, by the averaging unit, an average latency associated with the external memory device of the one or more external memory devices in response to determining the latency for each IO request of the plurality of IO requests.

3. The system of claim 2, wherein the device is further to:
calculate at least one of a maximum latency, a minimum latency, or a standard deviation value associated with the average latency responsive to determining the latency for each IO request of the plurality of IO requests.

4. The system of claim 2, wherein the device is further to:
generate a histogram indicating a number of latencies observed for each range of a plurality of ranges responsive to determining the latency for each IO request of the plurality of IO requests.

5. The system of claim 1, wherein the device is further to:
detect a plurality of IO requests associated with a set of external memory devices of the one or more external memory devices;
determine a latency for each IO request of the plurality of IO requests; and
determine an average latency associated with the set of external memory devices of the one or more external memory devices in response to determining the latency for each IO request of the plurality of IO requests.

6. The system of claim 1, wherein the device is further to:
compare an average latency associated with the external memory device with a threshold latency associated with the external memory device;
determine that the average latency fails to satisfy the threshold latency associated with the external memory device responsive to the comparison; and
generate a second indication indicating the average latency associated with the external memory device fails to satisfy the threshold latency associated with the external memory device.

7. The system of claim 6, wherein the device is further to:
select the threshold latency from a plurality of threshold latency associated with the one or more external memory devices.

8. The system of claim 6, wherein the device is further to:
compare the average latency associated with the external memory device with a second threshold latency associated with the external memory device;
determine the average latency fails to satisfy the second threshold latency associated with the external memory device responsive to the comparison; and
generate a third indication indicating the average latency associated with the external memory device fails to satisfy the threshold latency associated with the external memory device.

9. The system of claim 1, wherein the device is further to:
determine an identifier associated with the IO request; and
determine, based on the identifier, that the IO request is associated with the external memory device of the one or more external memory devices.

10. The system of claim 1, wherein the device is further to:
determine a type of IO request responsive to detecting the IO request associated with the external memory device, wherein the device is configured to determine the latency associated with a first type of IO request and determine a second latency associated with a second type of IO request responsive to determining the type of IO request.

11. The system of claim 10, wherein the first type of IO request is one of a write request, read request, flush request, deallocation request, or reservation request.

12. The system of claim 1, wherein
the register is associated with the external memory device of the one or more external memory devices.

13. The system of claim 12, further comprising a plurality of registers, wherein each register of the plurality of registers is associated with a different external memory device of the one or more external memory devices at a first point in time.

14. The system of claim 13, wherein a first external memory device of the one or more external memory devices is associated with a first register of the plurality of registers at the first point in time, and a second external memory device of the one or more external memory devices is associated with the first register at a second point in time.

15. The system of claim 1, wherein the interface is a peripheral component interconnect express (PCIe).

16. A method comprising:
identify a configuration stored within a control register of a device, wherein the configuration indicates an external memory device of one or more external memory devices coupled to the device;
detect, at a hardware component of the device coupled with an interface to the external memory device, an input/output (IO) request associated with the external memory device;
responsive to detecting the IO request, store a first timestamp in a data register;
detect, at the hardware component, an indication from the external memory device of a completion of the IO request associated with the external memory device;
responsive to detecting the indication, store a second timestamp in the hardware register; and
determine, by an averaging unit of the device, a latency associated with the IO request using the first timestamp and the second time stamp.

17. The method of claim 16, further comprising:
detecting a plurality of IO requests associated with the external memory device of the one or more external memory devices;
determine a latency for each IO request of the plurality of IO requests; and
determine an average latency associated with the external memory device of the one or more external memory devices in response to determining the latency for each IO request of the plurality of IO requests.

18. The method of claim 17, further comprising:
calculating at one of a maximum latency, a minimum latency, or a standard deviation value associated with the average latency responsive to determining the latency for each IO request of the plurality of IO requests.

19. A system comprising:
a device at a hardware circuitry coupled with one or more external devices, the device to:
  detect a plurality of requests associated with the one or more external devices;
  determine an identifier for each request of the plurality of requests responsive to receiving the plurality of requests;
  identify a configuration stored within a control register of the device, wherein the configuration indicates that one or more requests of the plurality of requests are associated with an external device of the one or more external devices;
  determine, by a hardware latency tracker of the device coupled with an interface to the external device, a latency associated with each request of the one or more requests; and
  determine, by an averaging unit of the device, an average latency associated with the external device responsive to determining the latency associated with each request of the one or more requests.

20. The system of claim 1 wherein the external device is one of a network adapter, a switch, a data processing unit (DPU), or a storage device.

* * * * *